(12) United States Patent
Schipporeit (10) Patent No.: US 7,729,105 B2
(45) Date of Patent: Jun. 1, 2010

(54) POWER DISTRIBUTION APPARATUS AND METHOD

(75) Inventor: Tate D. Schipporeit, Gillette, WY (US)

(73) Assignee: Prod-X, Inc., Omaha, NE (US)

( * ) Notice: Subject to any disclaimer, the term of this patent is extended or adjusted under 35 U.S.C. 154(b) by 188 days.

(21) Appl. No.: 11/770,936

(22) Filed: Jun. 29, 2007

(65) Prior Publication Data

US 2008/0123255 A1      May 29, 2008

Related U.S. Application Data

(60) Provisional application No. 60/818,559, filed on Jul. 3, 2006.

(51) Int. Cl.
 *H02B 1/04* (2006.01)
(52) U.S. Cl. .................. 361/643; 361/641; 361/644; 361/647
(58) Field of Classification Search .................. None
See application file for complete search history.

(56) References Cited

U.S. PATENT DOCUMENTS

| | | | | |
|---|---|---|---|---|
| 3,753,049 A | * | 8/1973 | Plummer | 361/663 |
| 3,800,063 A | * | 3/1974 | Di Maggio et al. | 174/38 |
| 3,906,295 A | * | 9/1975 | Tessmer | 361/643 |
| 4,025,825 A | * | 5/1977 | Shrader | 361/670 |
| 5,404,266 A | * | 4/1995 | Orchard et al. | 361/667 |
| 5,710,804 A | * | 1/1998 | Bhame et al. | 455/575.1 |
| 5,838,078 A | * | 11/1998 | Tipton | 307/147 |
| 6,002,570 A | * | 12/1999 | Meyerhoefer et al. | 361/111 |
| 6,404,620 B1 | * | 6/2002 | Piccione | 361/601 |
| 6,828,502 B2 | * | 12/2004 | Green | 174/480 |
| 7,286,339 B2 | * | 10/2007 | Baca | 361/643 |
| 7,344,392 B2 | * | 3/2008 | Rubin et al. | 439/108 |
| 7,405,923 B2 | * | 7/2008 | Kelly et al. | 361/644 |

OTHER PUBLICATIONS

Power Distribution Boxes, www.electricwest.com/products, not later than Jul. 2, 2006.

* cited by examiner

*Primary Examiner*—Boris L Chervinsky
(74) *Attorney, Agent, or Firm*—Santangelo Law Offices (57) ABSTRACT

Aspects of the inventive technology may relate to a physical enclosure designed to house electrical componentry inside. More specifically, the inventive technology may relate to a physical enclosure that is designed to allow for the enclosure, perhaps within the same, unitary structure, of conductors (wires) as they enter the ground and wire splice devices that connect those wires with wires of smaller diameter. Aspects of the inventive technology may relate to provision of a wire splice mount(s) that hold splices in fixed position relative to the physical enclosure.

4 Claims, 11 Drawing Sheets

Prior Art

Fig. 9

Prior Art

POWER DISTRIBUTION APPARATUS AND METHOD

This is a United States non-provisional patent application and claims priority to U.S. provisional patent application No. 60/818,559, filed Jul. 3, 2006, entitled "Power Distribution Apparatus and Method", said provisional application hereby incorporated herein in its entirety.

BACKGROUND

Turbines, pumps and generally derricks are a few examples of components of wells that need power to extract oil, water or gas, as the case may be. Derricks or methane pumps spotting the landscape are a common site in the high desert country of the western US. Of course, wires need to travel to such power consumers in order to deliver power thereto, and whether for cost reasons or legal mandate, often such wires travel underground, and do so from a central power distribution site that facilitates maintenance, control and oversight of the power delivery to often irregularly and remotely located loads. Typically, such site includes safety features (which may also afford power control capabilities) such as circuit breakers. Also included are protective coverings that cover splices between a first set of wires that may travel from a circuit breaker panel to a second set of larger diameter wires that then travel underground to their respective remote power consuming devices. And, as these sites are primarily power distribution sites, power (whether it be three phase or other type) entering in a first number of wires is typically distributed via a second number of wires (where such second number is greater than the first number) to remote power consuming devices.

However, conventional manners of distributing power to meet such needs, although perhaps including circuit breakers and their accompanying safety features, seem to be suboptimal in the facilitation of power delivery and their alleviation of problems that may arise in the often harsh outdoor environment. Examples of problems include, but are not limited to: unsecured wire splices that "float" inside a weather protective covering, thereby increasing the likelihood of electrical problems and making splice maintenance suboptimal; improvised, "jerry-rigged" construction techniques such as use of a PVC riser (typically established below a larger, upper housing) to cover wires as they enter the ground to travel to remote power consuming devices, thereby compromising structural integrity and increasing initial labor and long term maintenance costs.

SUMMARY OF THE INVENTIVE TECHNOLOGY

Aspects of the inventive technology may relate to a physical enclosure designed to house electrical componentry inside. More specifically, the inventive technology may relate to a physical enclosure that is designed to allow for the enclosure, perhaps within the same, unitary structure, of conductors (wires) as they enter the ground and wire splice devices that connect those wires with wires of smaller diameter. Aspects of the inventive technology may relate to provision of a wire splice mount(s) that hold splices in fixed position relative to the physical enclosure. The inventive technology may also involve a circuit breaker panel, whether enclosed in the same structural enclosure housing the wire splice devices, or in a different enclosure. As such, in preferred embodiments, the lower edge of the enclosure may abut the ground below it.

The inventive technology may find particular application in the delivery of power to a plurality of remote, individual loads. Particular application may be found in the delivery of power to wells (whether they be oil, methane or other type). As such, a typical site in which the inventive technology may be applied is rugged, high desert country, in which a central line power must be delivered, typically underground, through wires and over significant distances (perhaps even more than a mile) to a plurality of remote wells. However, there is certainly other terrain in which the inventive technology may find application, perhaps to power apparatus other than wells.

Advantages of the inventive technology include but are not limited to: elimination of the need to cover wires coming out of the ground with enclosing structures (e.g., risers) that are different from that enclosure housing wire splice devices; elimination of the often difficult task of placing many load wires (typically the larger wires delivering power, perhaps underground, to a power consuming load such as a well) in a covering such as a PVC riser; provision of a sufficiently large enclosed space in which to easily manage (e.g., reposition and connect) wires as appropriate; and economy of design and manufacture.

DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention.

These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In certain embodiments of the inventive technology, power, whether it be three phase or other type, may come up from the ground via wires, enter a housing of sorts (1) (whether it be a riser, a circuit breaker panel, or a wire splice device enclosure), be distributed to breakers (2) (e.g., there may be one circuit breaker per well to be powered), and thereafter may be sent via a first set of wires (10) to wire splices (3) such as wire splice devices (e.g., wire splice blocks) that are used to introduce a second set of wires (e.g., larger wires, having larger diameter) (4) into the current conveyance system for their reduced resistance benefit as they deliver power to remote power consuming devices. The larger wires (4) (load wires) may then exit the space defined by the enclosure (5) (whether they pass through a physical surface of the enclosure or not) and immediately enter an underlying ground surface (11), after which they may carry power underground to a plurality of remote power consuming devices (12) (e.g., wells, such as oil, methane, or other type, including any pumps, turbines and/or derricks thereof), perhaps in some instances located more than a mile away. A power consuming device is remote if indeed a larger diameter wire is used to deliver power to such power consuming devices due to the reduced resistance of such wires. It is of note that in some applications, the power drawn by that load might only be 20 amps.

Such a splicing system may allow for the use of breakers that are smaller than those that can accommodate the larger wires—in at least one application of the inventive technology, a 40A, 600V breaker capable of handling a wire size no larger than a #6 THHN can be used even though the wire eventually delivering power to load is a 4/0 or 250MCM. Of course, the further away the load, the larger the wire should be in order to reduce voltage drop created by the wire's resistance.

An aspect of the inventive technology may relate to wire splice mounts (13) that hold wire splices in fixed position relative to the enclosure. Such mounts may include any of a variety of manners of securing one physical object, device or structure to another. As but a few examples, such mounts include welds, bolts, epoxies and/or straps. One mount may be used for all splices in an enclosure, or more than one mount may be used for all splices in an enclosure. The term mount does not necessarily require direct mounting (e.g., attachment directly to the enclosure), but indeed the term also includes "indirect" mounting where, e.g., the splices may be secured to a bar which is itself secured at least one end to the enclosure.

Figure 1:
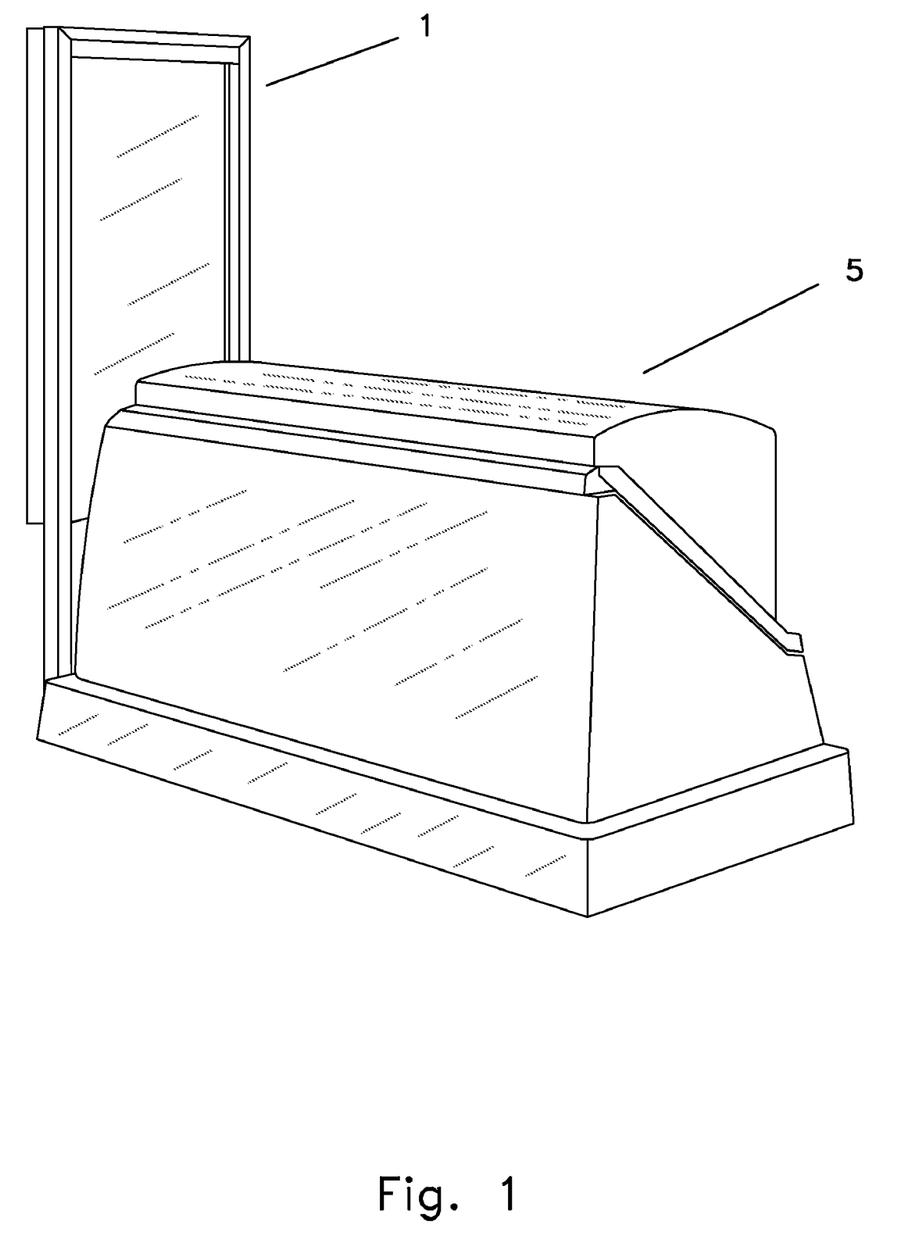
FIG. 1 shows a rear perspective view of one embodiment of the inventive technology in closed configuration. On the left is a circuit breaker panel (a general term including breakers and a surrounding enclosure).
Figure 2:
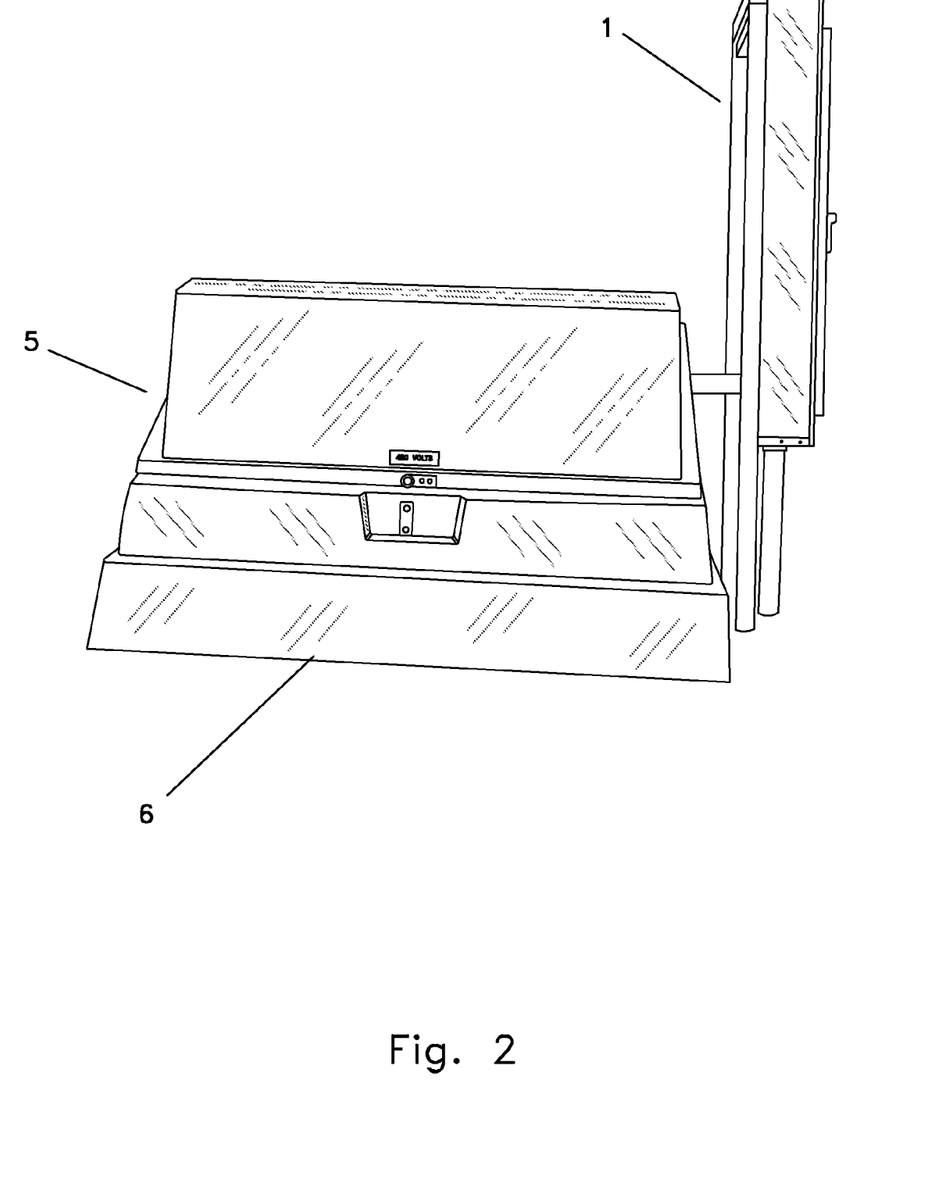
FIG. 2 shows a front view of one embodiment of the inventive technology in closed configuration. On the right is shown a side view of a circuit breaker panel.

At least one embodiment of the inventive technology may relate to a physical enclosure designed to enclose electrical componentry such as, perhaps, wire splices (3) (a broad term that includes not only direct, wire to wire splices (without any associated componentry), but also those splices accomplished via a device, such as a wire splice block that can be used to securely connect two wires). The enclosure may have a lower, ground-contacting portion (6) (e.g., that may rest directly on the ground below and/or penetrate the ground) that creates a seal (14) between the physical enclosure and the underlying ground surface), thereby allowing passage of load wires directly from a space (15) defined by the enclosure immediately into the ground to their respective loads. As such, the enclosure may enclose the wires when they enter the ground, and there may be no need to protectively cover wires (a term that includes ground and non-ground wires, whether as part of a three phase system or not) entering the ground with a separate enclosure(s) such as riser(s). Indeed, the same enclosure—a unitary enclosure (5)—may be used to enclosure wire splices and the larger wires as they enter the ground under the enclosure. A unitary enclosure need not be made from only one piece; indeed, it may be made from several parts that together, when attached, form, for example, a single three dimensional shape (a rough rectangular prism as shown in FIGS. 1 and 2, e.g., or a pyramid (perhaps without an upper section), as but two examples).

It is of note that apparatus having two distinct enclosures—one enclosing the splices and the other enclosing the larger wires to their entry into the underlying ground surface—do not have a unitary enclosure that encloses the splices and the wires traveling from such splices as they enter the ground. Such apparatus also do not disclose an enclosure that has a lower ground contacting portion that creates a seal between itself and an underlying ground surface, where that enclosure also encloses the splices between smaller and larger wires. It is also of note that the enclosure is deemed to enclose wires even where it only encloses a portion of the entire length of such wires. Indeed, at least as to the second set of wires, such is the case in a preferred embodiment of the inventive technology.

Figure 3:
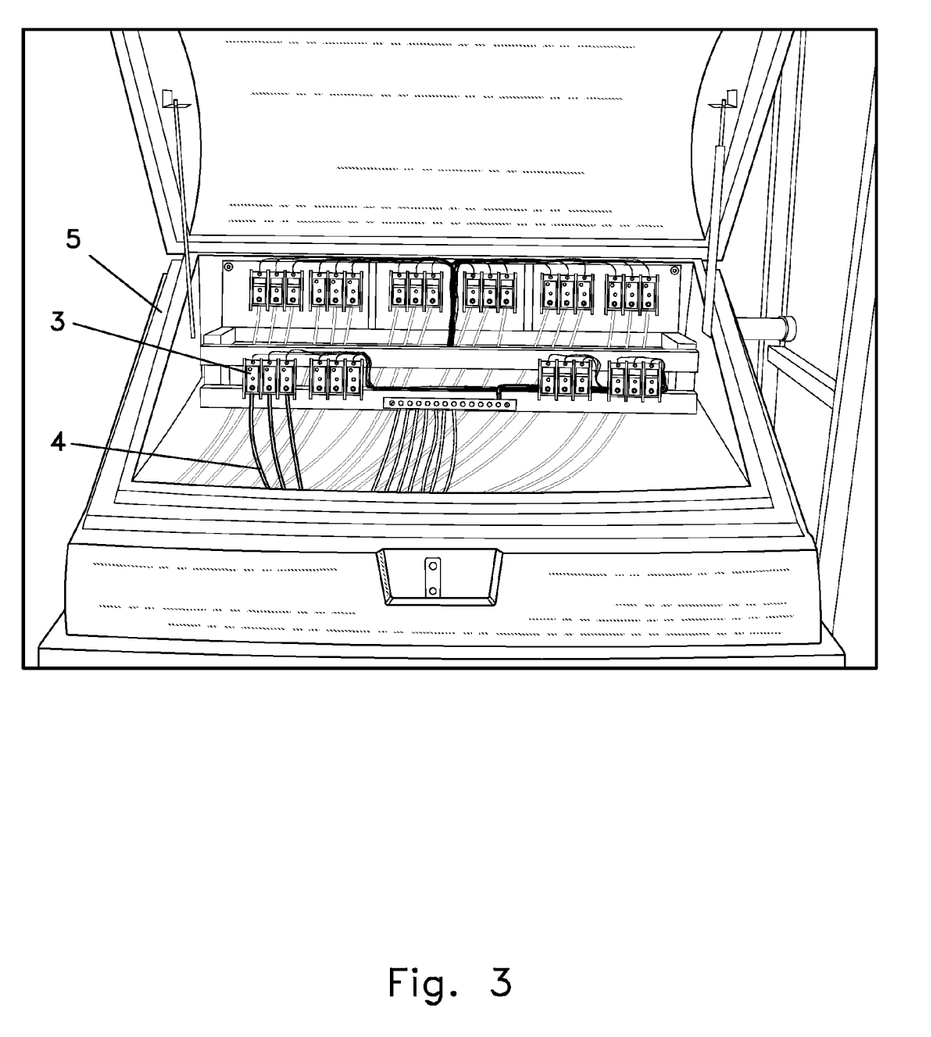
FIG. 3 shows a front view of the enclosure in one embodiment of the inventive technology in open configuration; wire splice blocks, each connecting different size wires, are also shown.
Figure 4:
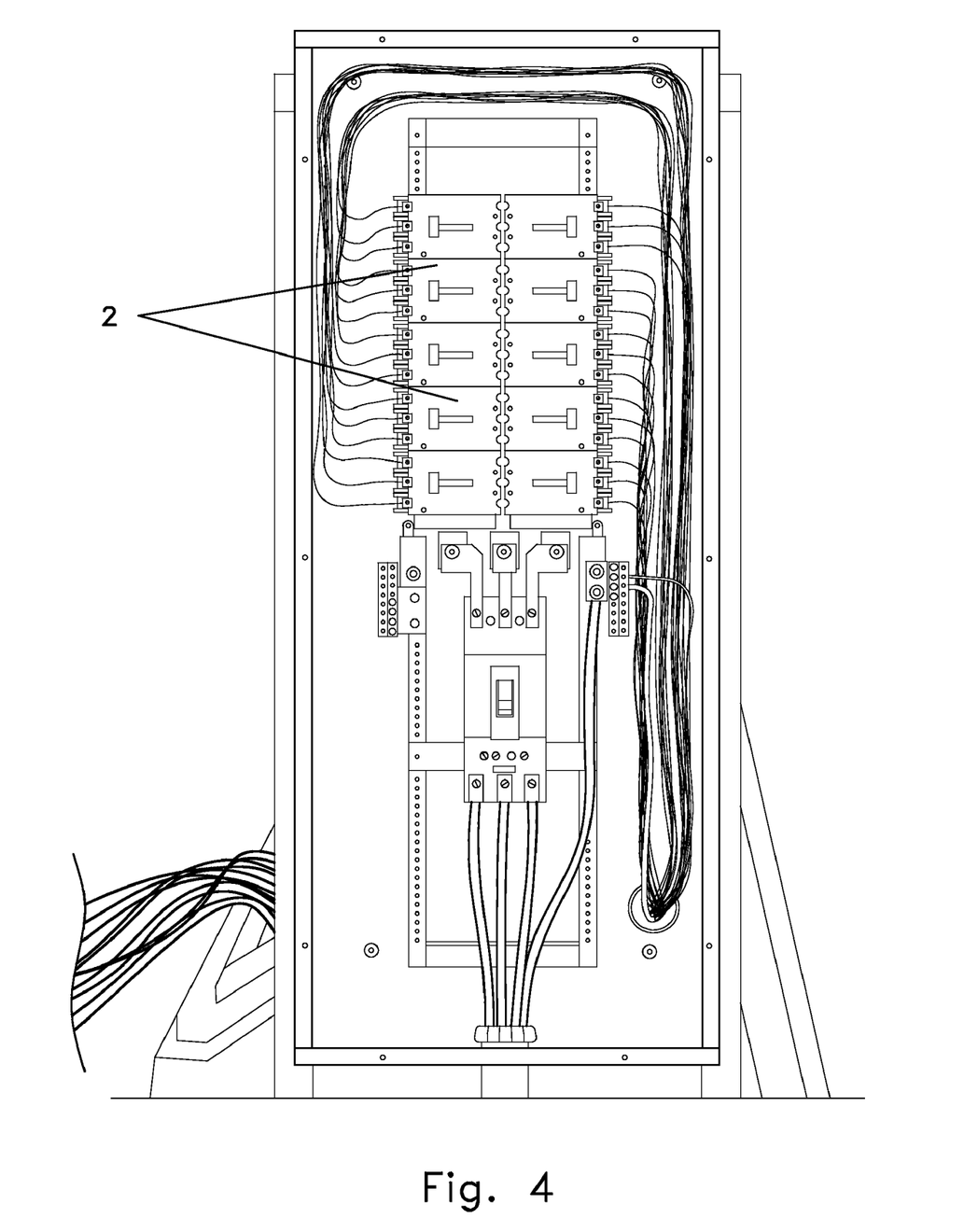
FIG. 4 shows a front view of an open circuit breaker panel, as appears in an embodiment of the inventive technology.
Figure 5:
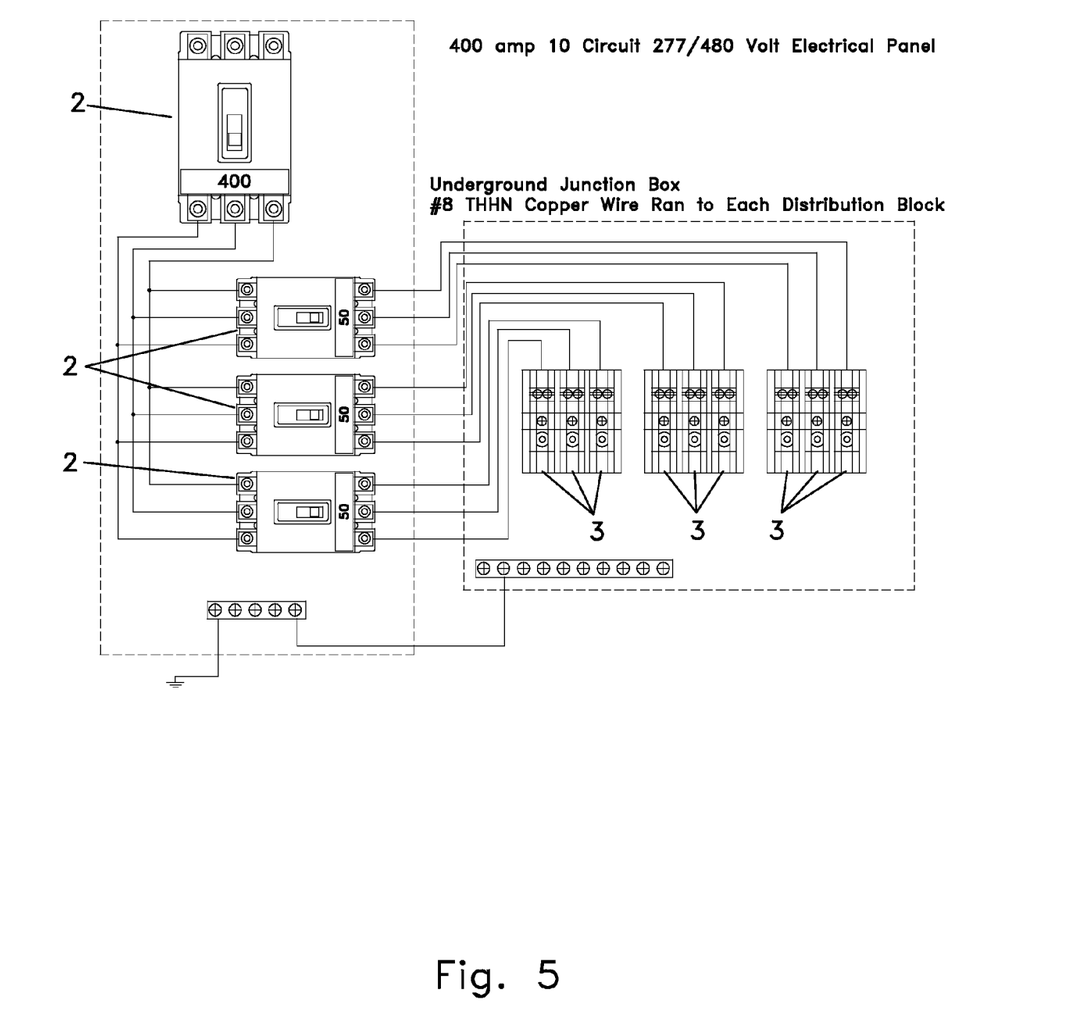
FIG. 5 shows an electrical schematic relative to an embodiment of a portion of the inventive technology (n.b. that only smaller diameter wires are shown).

In preferred embodiments, the enclosure can be large enough to enable facile repositioning and splicing of even the larger wires, and would include a door (17) allowing access to the splices. Of course, an open door effects an open configuration of the enclosure (see, e.g., FIG. 3); a closed door, a closed configuration of the enclosure (see, e.g., FIG. 2). The term door is broad, and includes any openable and closeable panel allowing access to the space defined by the enclosure.

The ground contacting portion (6) of the enclosure may be simply be a lower edge of the enclosure and/or a lower panel surface (e.g., a bottom) of the enclosure. The enclosure may rest on and/or may penetrate an underlying surface; either design would create a seal (14) between the enclosure and the ground substantially below it. It should be noted that in order to enclose, the enclosure itself need not have a lower horizontal surface that lies below the enclosed devices, as indeed, the ground may provide the lower "covering" of the enclosed devices. Of course, all relevant code (e.g., the NEC) must be adhered to, particularly as it may relate to the need for covering wires as they enter/exit the ground.

Figure 6:
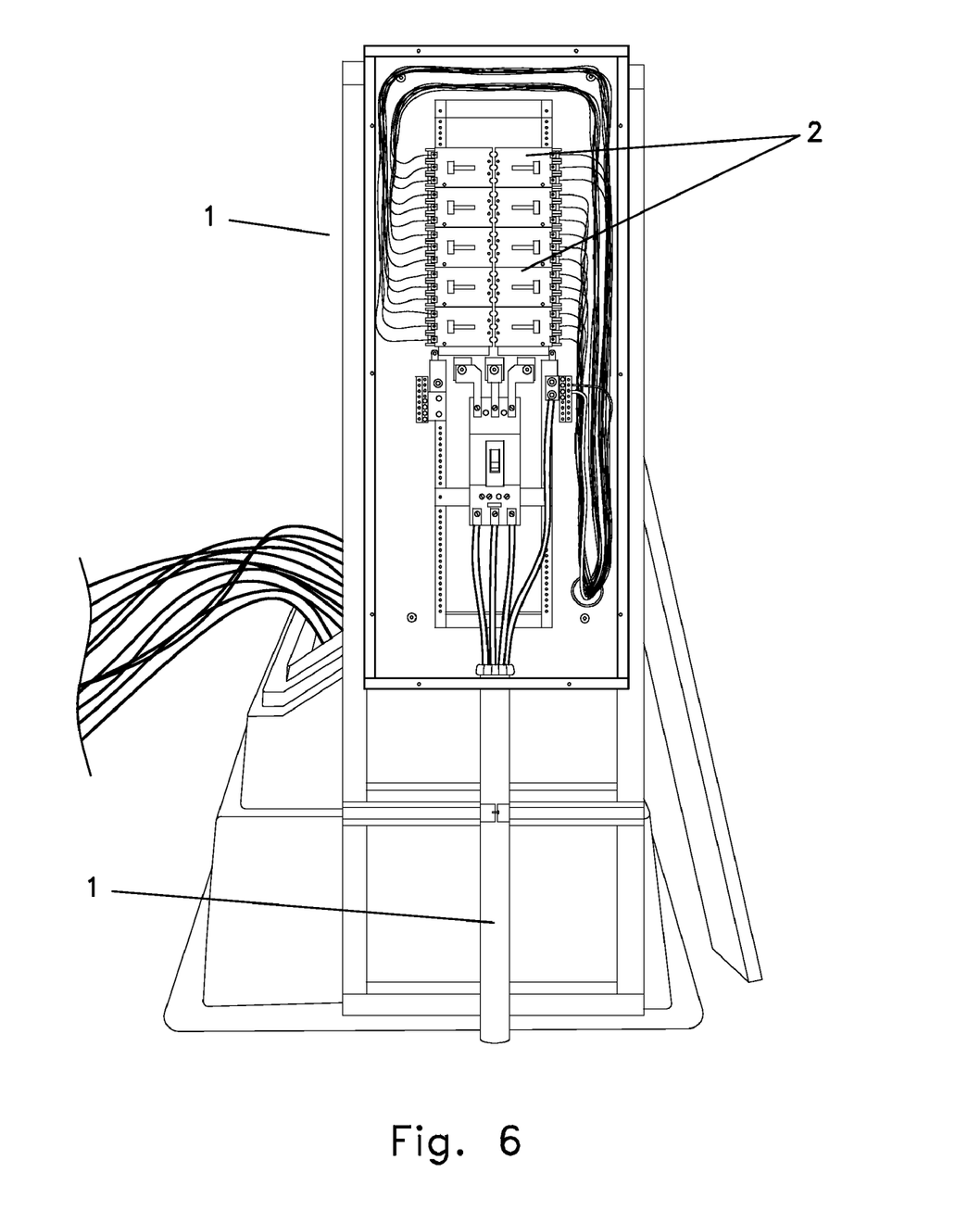
FIG. 6 shows a front view of an open circuit breaker panel, in addition to a side view of an open enclosure enclosing wire splices, as appears in an embodiment of the inventive technology.
Figure 7:
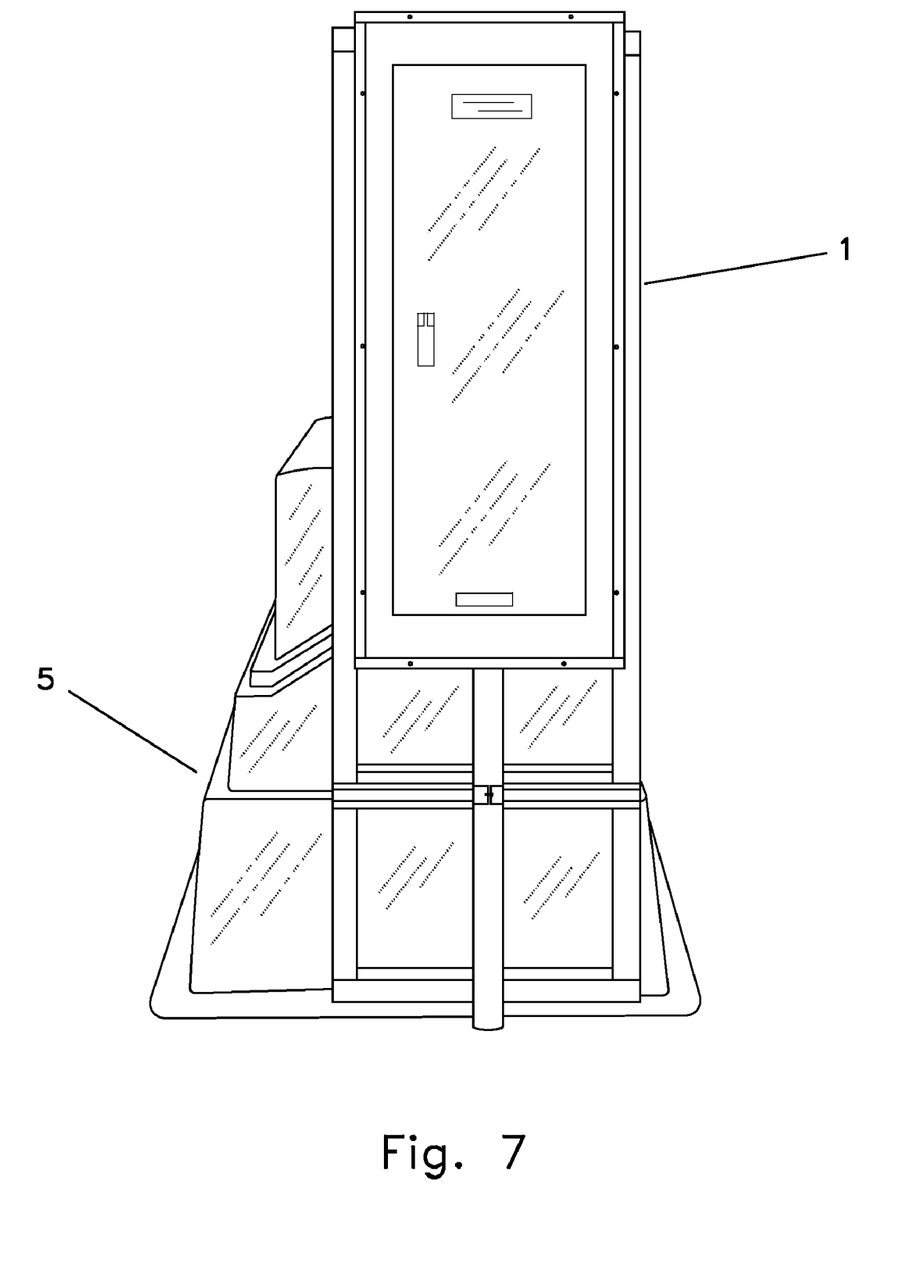
FIG. 7 shows a front view of one embodiment of the inventive technology in closed configuration, with the circuit breaker panel appearing in the foreground.
Figure 8:
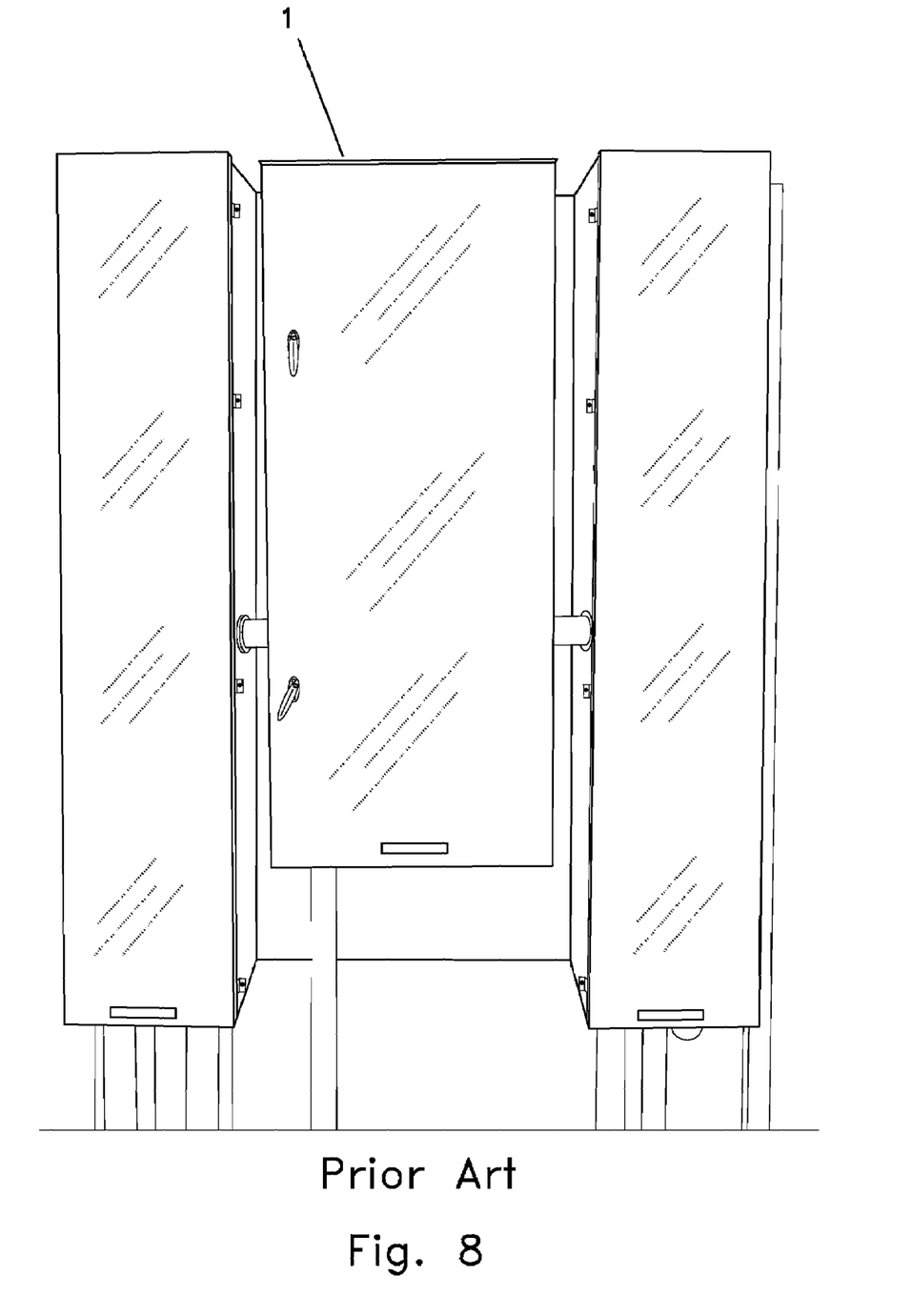
FIG. 8 shows a view of a prior art power distribution apparatus in closed configuration.

The inventive technology may include a circuit breaker panel which may or may not be enclosed by the same enclosure that encloses the wire splices. The circuit breaker panel may include its own enclosure (as in FIG. 6) (as in the case where it is established outside of the physical enclosure enclosing the wire splices) or may instead be within the enclosure that houses the wire splices. As mentioned, power wires (e.g., three power wires for three phase power, and perhaps a ground wire) may emanate from the ground through a riser and travel to the circuit breaker panel. However, the inventive technology may also house these power wires in the same enclosure that houses the circuit breakers, the wire splice devices, or both.

There is, of course, a wide variety of materials that can be used for the wire splice enclosure (fiberglass, steel, plastic, as but a few examples). The enclosure may have attached thereto ground mounting apparatus (16) (e.g., spike protrusions mounted to the enclosure, flanges with bolt or spike holes mounted to the enclosure) that enable (perhaps with bolts or drivable spikes in some instances) stable mounting of the enclosure to the underlying ground (whether it be dirt, sand, and/or a concrete footing(s) or pilings, as but a few examples). Other embodiments may involve an enclosure that merely sits on the ground below, perhaps relying on its weight and the wires entering and anchored in the ground—and their attachments to mounted splices—for stability.

Figure 9:
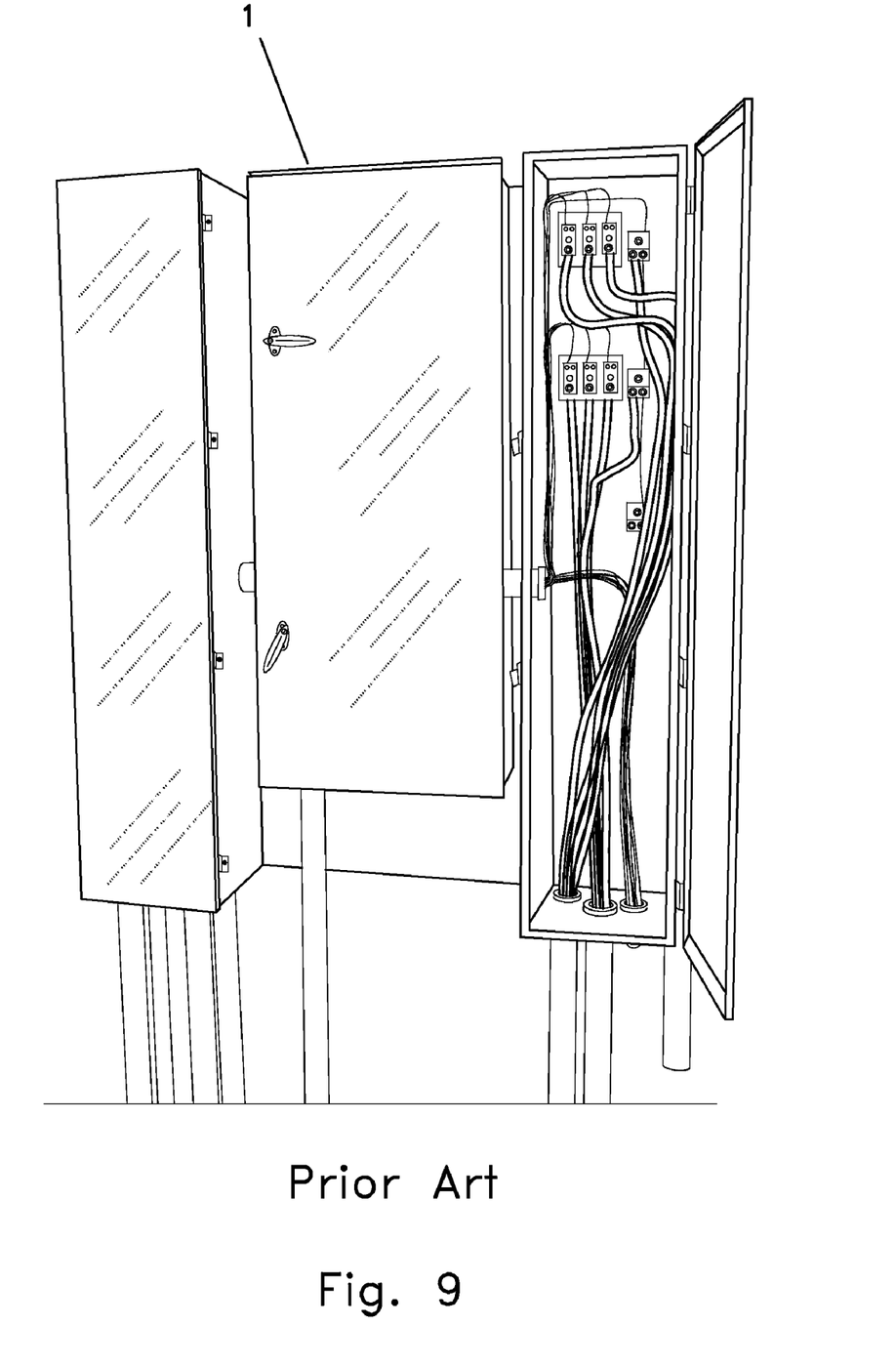
FIG. 9 shows a view of a prior art power distribution apparatus, with an enclosure housing the wire splices (e.g., blocks as shown) in open configuration.
Figure 10:
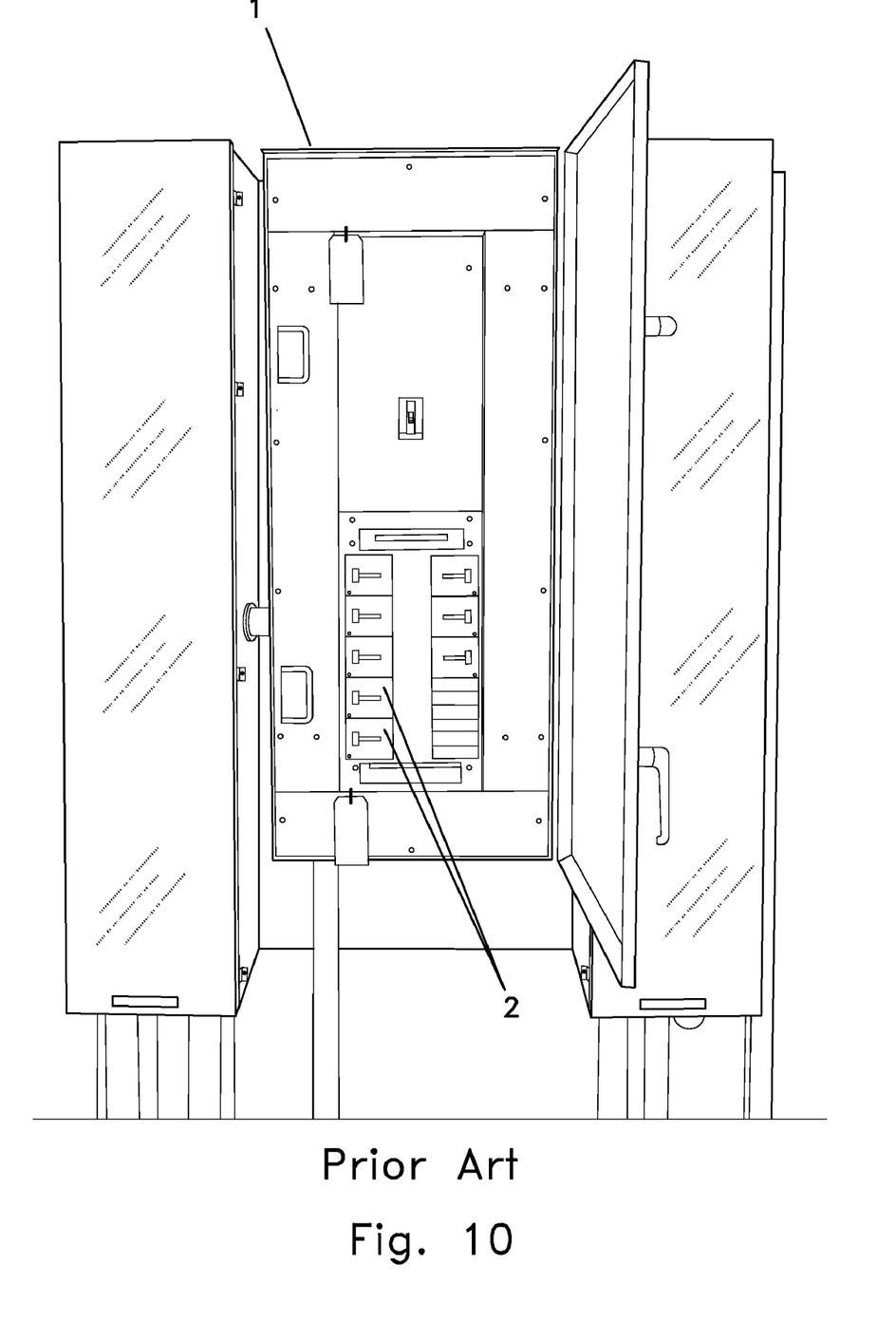
FIG. 10 shows a view of a prior art power distribution apparatus, with an enclosure housing the circuit breaker panel in open configuration.
Figure 11:
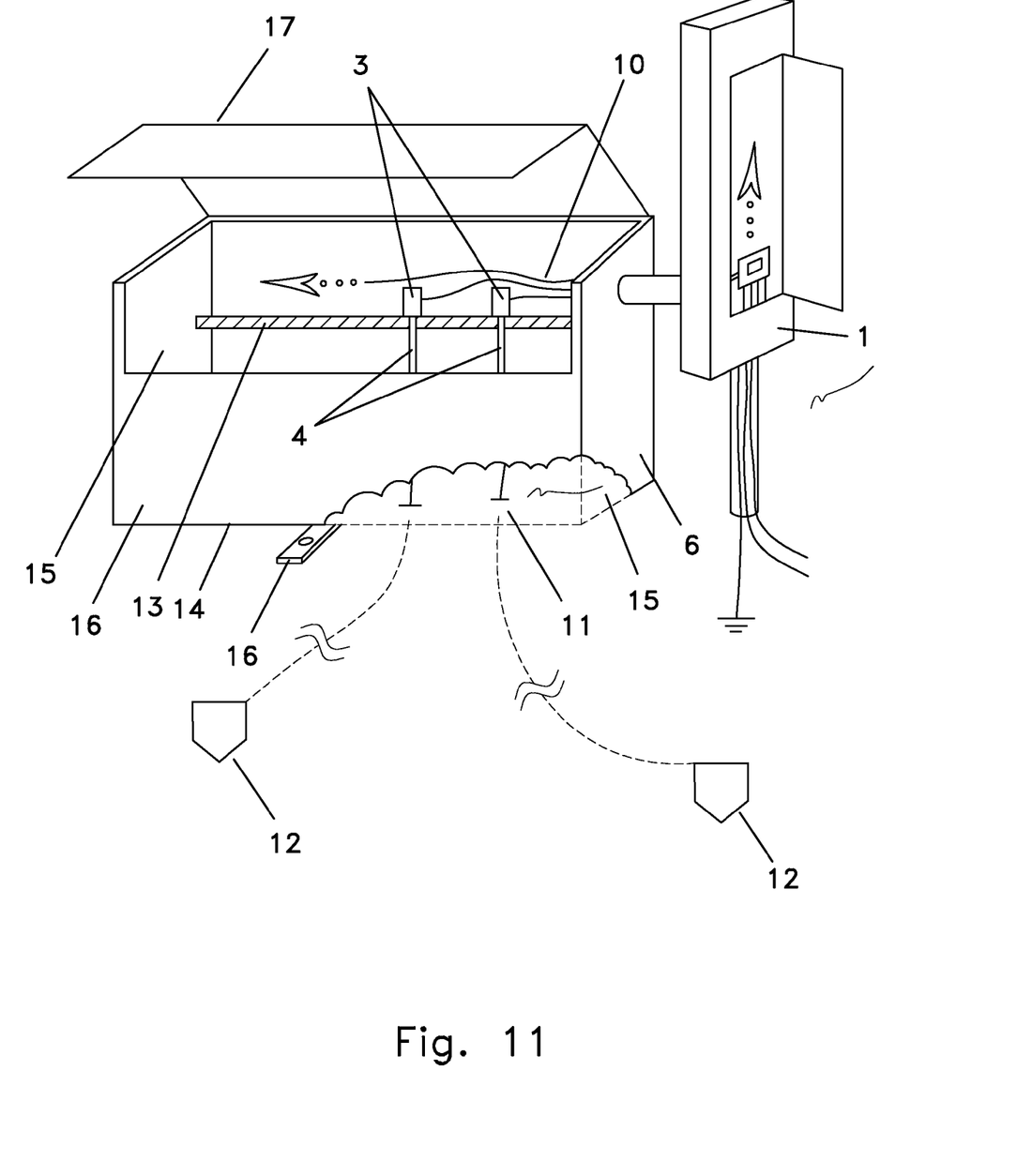
FIG. 11 shows a sketch of an embodiment of the inventive technology (single phase power distribution apparatus shown for purposes of simplicity).

Indeed, a primary difference between the inventive technology disclosed herein and the prior art is clear upon a comparison of FIGS. 1 (inventive technology) and 9 (prior art). In FIG. 9, it is clear that load wires (the typically relatively larger wires, also known as the second set of wires) that enter the ground and thereafter carry power to loads such as wells are protectively enclosed in ground contacting risers. However, preferred embodiments of the inventive technology protect such wires not with risers, but rather with the same ground contacting enclosure that encloses the wire splices.

Embodiments of the inventive technology may relate to a power distribution method that may comprise all, or fewer than all, of the following steps: passing a first set of wires through circuit breakers of a circuit breaker panel; splicing, at a plurality of wire splices, said first set of wires with a second set of wires that are larger than said first set of wires; enclosing said plurality of wire splices within a unitary physical enclosure; mounting said plurality of wire splices to said unitary physical enclosure; creating, with said unitary physical enclosure, a seal between said unitary physical enclosure and an underlying ground surface beneath said unitary physical enclosure; passing said second set of wires from said plurality of wire splices to through said underlying ground surface; and powering a plurality of remote power consuming devices. In particular embodiments, the step of passing a first set of wires through circuit breakers of a circuit breaker panel may occur outside of said unitary physical enclosure. Further, the step of powering a plurality of remote power consuming devices may comprise the step of powering a plurality of wells, the step of powering a plurality of remote power consuming devices may comprise the step of powering with three phase power, the step of splicing may comprise the step of splicing at a plurality of wire splice blocks, and the unitary physical enclosure may comprise a door.

As can be easily understood from the foregoing, the basic concepts of the present invention may be embodied in a variety of ways. It involves both electrical componentry enclosure techniques as well as devices to accomplish the appropriate enclosure. In this application, the enclosure techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "enclosure" should be understood to encompass disclosure of the act of "enclosing"—whether explicitly discussed or not—and, conversely, were there effectively disclosure of the act of "enclosing", such a disclosure should be understood to encompass disclosure of an "enclosure" and even a "means for enclosing" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information statement filed with the application are hereby appended and hereby incorporated by reference, however, as to each of the above, to the extent that such information or statements incorporated by reference might be considered inconsistent with the patenting of this/ these invention(s) such statements are expressly not to be considered as made by the applicant(s).

Thus, the applicant should be understood to have support to claim and make a statement of invention to at least: i) each of the enclosure devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A power distribution apparatus comprising:
    a first set of wires that travel from a circuit breaker panel;
    a physical enclosure enclosing therein:
    (a) said first set of wires;
    (b) a second set of wires that are larger than said first set of wires; and
    (c) wire splices, each of which connects one wire of said first set of wires with one wire of said second set of wires;
    wherein said wire splices are held in fixed position relative to said physical enclosure by at least one wire splice mount,
    wherein said second set of larger wires exits a space defined by said physical enclosure to immediately enter an underlying ground to thereafter power a plurality of remote wells, and
    wherein said physical enclosure has a lower ground contacting portion that creates a seal between said physical enclosure and said underlying ground surface,
    wherein said circuit breaker panel is established outside of said physical enclosure,
    wherein said physical enclosure comprises a door allowing access to said wire splices, and
    wherein said physical enclosure does not comprise a lower floor surface.

2. A power distribution apparatus as described in claim 1 wherein said first and second sets of wires carry three phase power.

3. A power distribution apparatus as described in claim 1 wherein said wells are selected from the group consisting of methane wells and oil wells.

4. A power distribution apparatus as described in claim 1 wherein said physical enclosure is a unitary physical enclosure.

* * * * *